United States Patent Office 2,870,155
Patented Jan. 20, 1959

2,870,155

PURIFICATION OF AMIDES OF PYRIDINE CARBOXYLIC ACIDS

Robert S. Aries, New York, N. Y.

No Drawing. Application December 30, 1955
Serial No. 556,453

5 Claims. (Cl. 260—294.9)

The present invention relates to a novel process for the preparation of nitriles of pyridine carboxylic acids from impure amides of said pyridine carboxylic acids. More particularly, it relates to a novel process for obtain purified amides of pyridine carboxylic acids from impure amide contaminated with free acid and/or color forming bodies, the purification procedure going through formation of the nitrile.

In the conventional process for the preparation of amides of pyridine carboxylic acids by amidation of the acid with ammonia, an amidation melt is obtained containing the amide with several percent of impurities such as unconverted acid, pyridine and color forming bodies. The recrystallized amide because of the niacin present tests acidic and is therefore unsuited for direct use as amide in that it fails to meet the requirements of the U. S. Pharmacopoeia.

Numerous efforts have been made to effect the purification, one technique involving recrystallization but even the recrystallized product is acidic due to free acid and fails to meet the standard tests for purity. Another purification procedure involves neutralization of the free acid in solution by means of caustic soda but this results in an amide product having too high an ash content. Neutralization with ammonia to reduce the acid value is only temporarily effective since on drying the product loses the ammonia and again becomes acidic.

Amidation of pyridine carboxylic acids produces color bodies and tars. Purification by repeated recrystallization and treatment with decolorizing carbons is necessary. Traces of impurities in the starting acid lead to even greater quantities of tars and colors. Consequently, a highly pure acid is the favored starting raw material in spite of its higher cost.

Other experiments which have been partially successful include removal of the calcium salt of the free acid in various solvent media, and distillation with special expensive entraining agents. Another recent technique involved the dehydration of the amidation melt to form the nitrile. Unfortunately, because of the method by which the dehydration was effected the nitrile was contaminated with considerable amounts of amide and free acid, necessitating still further purification procedures.

It is an object of the present invention to provide means whereby an amidation melt may be purified readily and inexpensively to obtain a product meeting accepted standards.

A further object of the invention is to provide a process whereby amidation melt may be converted to the nitrile in such manner that any residual impurities can be removed easily, the nitrile then being capable of being restored to amide in pure form and high yield.

The previous dehydration techniques involved contacting the melt with a catalyst over prolonged periods of time. In the course of the dehydration, the free acid present due to localized overheating of the mass was decarboxylated to pyridine which represented a conversion of an expensive material to an inexpensive material. Moreover, the water formed in the course of the dehydration resulted in formation of additional acid by hydrolysis of some of the amide and this too was decarboxylated.

In accordance with the present invention, however, the dehydration is effected in the vapor phase so that there is no prolonged heating of the acid with attendant decarboxylation thereof. The crude amidation melt is vaporized in a stream of gas and the vapor passed over a dehydration catalyst such as phosphates, silica gel, alumina gel, mixtures thereof, and the like, at elevated temperatures ranging between about 250° C. to about 550° C. Upon cooling the gas stream, the nitrile is condensed out and because of its volatility can easily be purified by distillation. The purified nitrile can be hydrolyzed back to the amide and the non-condensible gases can be recycled to the vaporizer for the melt.

Any free acid initially present in the melt is decarboxylated to pyridine in the course of the reaction. The pyridine and any color bodies if condensed with the nitrile will be separated during the distillation. In spite of the fact that inorganic ash impurities or various color bodies may have been present initially they will not be contained in the final product which is also freed of acid. Consequently, the process permits use of a highly impure amidation melt. The conversion of amide to nitrile can easily be achieved in a 95% yield while the reconversion is almost quantitative and is almost as simple as recrystallization from water.

As the entraining gas stream there may be employed an inert gas such as nitrogen or the like. In a preferred embodiment, however, ammonia is employed as the gas since any free acid which is present will be converted to the amide and will form additional amounts of the nitrile.

While niacin can be directly vaporized with ammonia, the low volatility of niacin makes it far more difficult to vaporize the free acid and more drastic and prolonged heating is required. As a result a great deal of niacin is decarboxylated with formation of undesirable pyridine. Moreover, the niacin cannot be handled as a melt since if it is maintained as a liquid for any prolonged time decarboxylation will ensue. In contrast therewith, the amide can readily be handled as a liquid above its melting point without excessive decomposition, and therefore feeding can be effected with a liquid as opposed to feeding of the acid as a solid. Finally, uniform heating of the solid acid is far more difficult than uniform heating of the liquid amide. With the solid acid large temperature gradients must be maintained which result in local overheating and aggravate the problem of decarboxylation.

The following examples illustrate procedures in accordance with the present invention:

*Example 1*

U. S. P. niacinamide was melted and maintained at 150° C., the melt being fed into a vaporizer by means of a proportioning pump at a rate of 75 grams per hour. Nitrogen was admitted into the vaporizer at a rate of 150 grams per hour. The vaporizer consisted of several turns of ½ inch pipe immersed in a eutectic salt bath at a temperature of about 250° C. From the vaporizer the gas stream passed into a reactor consisting of 1½ inch stainless steel tube 3 feet long and electrically heated to a temperature of 375° C., the temperature being regulated by a thermowell extending to the center of the reactor. The reactor was packed with ⅛ inch granules of alumina to a height of 16 inches. Following the reactor the gas stream was passed through a water cooled condenser. The condensate collected after running the apparatus for 6 hours was distilled and the distillate found to be free of color and the odor of pyridine. A 97% yield of nicotinonitrile was obtained.

*Example 2*

A mixture of 95 parts by weight of U. S. P. niacinamide and 5 parts by weight of U. S. P. niacin was heated to 150° C to form a melt. Silica granules were substituted for the alumina catalyst of Example 1 and the process was repeated under the same conditions and feed rate. The condensate had a strong pyridine odor which was no longer present in the distillate. Based on the amount of niacinamide fed, nicotinonitrile was obtained in a 96.5 mole percent yield.

*Example 3*

A 95–5 weight mixture of niacinamide and niacin was passed through the apparatus of Example 1 using ammonia gas in place of nitrogen and using a catalyst composed of 15% by weight of alumina and 85% by weight of silica. A 96 mole percent yield of nicotinonitrile was obtained based on amide and acid fed.

*Example 4*

242 grams of off-grade niacin (98.5% pure, high in color bodies and high in ash content) were placed in a flask, ammonia gas was bubbled in, and the mass heated over a period of two hours to a temperature of 230–235° C. to form a liquid melt. The melt was fed into the apparatus of Example 1 over a period of 3½ hours. The vaporizing gas was ammonia fed in at 100 grams/hour, the vaporizing bath temperature being maintained at 280° C. and an alumina catalyst being employed. After distillation of the condensate, the distillate is mixed with 150 cc. of water and refluxed. A caustic soda solution of 1 gram NaOH in 50 cc. of water was added to the refluxing nitrile solution over a period of half an hour and the refluxing continued for another half hour to reform niacinamide. Following cooling, the product is filtered off by centrifugation and washed. The amide meets U. S. P. standards. The filtrate from the centrifuge was concentrated to yield a second crop of amide which also passed U. S. P. standards.

*Example 5*

The process of Example 1 was repeated using isonicotinic acid amide in place of niacinamide. Isonicotinonitrile was obtained in substantially the same yield, viz., 97 mole percent of theory.

Various changes and modifications may be made without departing from the spirit and scope of the present invention and it is intended that such obvious changes and modifications be embraced by the annexed claims.

What I claim is:

1. Process for the preparation of a pyridine carboxylic acid nitrile of high purity from an impure pyridine carcarboxylic acid amide which comprises vaporizing the amide in a stream of an inert gas, passing the vapors over a dehydration catalyst selected from the group consisting of silica gel, alumina gel and mixtures thereof at a temperature between about 250° C. and 550° C., and recovering the nitrile by condensation.

2. Process of claim 1 in which the inert gas is nitrogen.

3. Process for the preparation of nicotinic acid amide of high purity from a crude amidation melt comprising nicotinamide and niacin which comprises vaporizing said melt in a stream of an inert gas, passing the vapors over a dehydration catalyst selected from the group consisting of silica gel, alumina gel, and mixtures thereof at a temperature between about 250° C. and 550° C., condensing the nicotinic acid nitrile formed, hydrolyzing said nitrile to the amide, and recovering the amide.

4. The process of claim 1 in which pyridine carboxylic acid amide is nicotinamide.

5. The process of claim 1 in which the pyridine carboxylic acid amide is isonicotinamide.

References Cited in the file of this patent

UNITED STATES PATENTS

| | | |
|---|---|---|
| 2,166,971 | Schmidt et al. | July 25, 1939 |
| 2,245,548 | Ralston et al. | June 10, 1941 |
| 2,680,742 | Scudi et al. | June 8, 1954 |
| 2,685,586 | Benner et al. | Aug. 3, 1954 |